(12) United States Patent
Wakayama

(10) Patent No.: US 11,404,036 B2
(45) Date of Patent: Aug. 2, 2022

(54) COMMUNICATION METHOD, SOUND GENERATION METHOD AND MOBILE COMMUNICATION TERMINAL

(71) Applicant: Yamaha Corporation, Hamamatsu (JP)

(72) Inventor: Kazuki Wakayama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/173,463

(22) Filed: Feb. 11, 2021

(65) Prior Publication Data

US 2021/0166669 A1 Jun. 3, 2021

Related U.S. Application Data

(63) Continuation of application No. 16/506,530, filed on Jul. 9, 2019, now Pat. No. 10,957,295, which is a
(Continued)

(30) Foreign Application Priority Data

Mar. 24, 2017 (JP) .............................. JP2017-059040

(51) Int. Cl.
*G10H 1/00* (2006.01)
*A63F 13/50* (2014.01)
(Continued)

(52) U.S. Cl.
CPC ......... *G10H 1/0083* (2013.01); *A63F 13/235* (2014.09); *A63F 13/50* (2014.09); *G10H 1/346* (2013.01)

(58) Field of Classification Search
CPC .... G10H 1/0083; G10H 1/346; A63F 13/235; A63F 13/50
See application file for complete search history.

(56) References Cited

U.S. PATENT DOCUMENTS 5,005,460 A * 4/1991 Suzuki .................... G06F 3/014
84/600
6,198,034 B1 * 3/2001 Beach .................. G10H 1/0083
84/407
(Continued)

FOREIGN PATENT DOCUMENTS

EP 2 442 300 A1 4/2012
JP 2012-088378 A 5/2012
(Continued)

OTHER PUBLICATIONS

English translation of Japanese-language Office Action issued in Japanese Application No. 2020-122640 dated Jun. 29, 2021 (three (3) pages).
(Continued)

*Primary Examiner* — Robert W Horn
(74) *Attorney, Agent, or Firm* — Crowell & Moring LLP

(57) ABSTRACT

A sound generation device according to an embodiment of the present invention includes an identification unit configured to identify one mobile communication terminal from one or more mobile communication terminals capable of communicating, an acquisition unit acquiring setting data regarding generation of a sound or control of generation of a sound from identified one mobile communication terminal, and a sound generation unit configured to detect an operation on an operation unit and outputting a sound on the basis of detected operation and the setting data.

15 Claims, 11 Drawing Sheets

Related U.S. Application Data continuation of application No. PCT/JP2018/011660, filed on Mar. 23, 2018.

(51) Int. Cl.
  *A63F 13/235* (2014.01)
  *G10H 1/34* (2006.01)

(56) References Cited

U.S. PATENT DOCUMENTS

| | | | | |
|---|---|---|---|---|
| 6,462,264 | B1* | 10/2002 | Elam | G10H 1/0066 |
| | | | | 341/60 |
| 6,897,779 | B2* | 5/2005 | Nishitani | G10H 1/0083 |
| | | | | 84/600 |
| 7,012,182 | B2* | 3/2006 | Nishitani | G10H 1/00 |
| | | | | 84/477 R |
| 7,038,122 | B2* | 5/2006 | Nishitani | G10H 1/0083 |
| | | | | 84/723 |
| 7,161,079 | B2* | 1/2007 | Nishitani | G10H 1/0008 |
| | | | | 84/612 |
| 7,183,477 | B2 | 2/2007 | Nishitani | |
| 7,294,777 | B2* | 11/2007 | Hofmeister | G10H 1/0083 |
| | | | | 310/329 |
| 7,684,572 | B2* | 3/2010 | Ito | G10H 1/0083 |
| | | | | 381/119 |
| 8,629,344 | B2* | 1/2014 | Yamanouchi | G10H 1/0008 |
| | | | | 84/615 |
| 10,067,733 | B2* | 9/2018 | Park | G10H 1/0008 |
| 2002/0126014 | A1 | 9/2002 | Nishitani | |
| 2002/0166437 | A1* | 11/2002 | Nishitani | G10H 1/0008 |
| | | | | 84/600 |
| 2002/0166439 | A1 | 11/2002 | Nishitani | |
| 2002/0170413 | A1* | 11/2002 | Nishitani | G10H 1/053 |
| | | | | 84/600 |
| 2005/0098021 | A1* | 5/2005 | Hofmeister | G10H 1/0556 |
| | | | | 84/453 |
| 2008/0125172 | A1* | 5/2008 | Leon | H04L 67/04 |
| | | | | 455/557 |
| 2010/0100205 | A1* | 4/2010 | Park | G10H 1/0083 |
| | | | | 700/94 |
| 2010/0287471 | A1* | 11/2010 | Nam | A63F 13/2145 |
| | | | | 715/702 |
| 2011/0028218 | A1* | 2/2011 | Gomes | G10H 3/188 |
| | | | | 463/39 |
| 2013/0011111 | A1* | 1/2013 | Abraham | G10H 1/0555 |
| | | | | 386/200 |
| 2013/0022211 | A1* | 1/2013 | Schild | G10H 1/361 |
| | | | | 381/61 |
| 2013/0236869 | A1* | 9/2013 | Sakazaki | G09B 5/04 |
| | | | | 434/247 |
| 2015/0143976 | A1* | 5/2015 | Katto | G10H 7/00 |
| | | | | 84/602 |
| 2015/0331659 | A1* | 11/2015 | Park | G10H 1/0083 |
| | | | | 700/94 |
| 2018/0286366 | A1* | 10/2018 | Oguro | G10H 1/368 |
| 2019/0333488 | A1* | 10/2019 | Wakayama | A63F 13/35 |
| 2020/0111461 | A1* | 4/2020 | Dron | G10H 1/0008 |
| 2020/0164522 | A1* | 5/2020 | Sohn | B25J 13/003 |
| 2021/0166669 | A1* | 6/2021 | Wakayama | G10H 1/0083 |

FOREIGN PATENT DOCUMENTS

| | | |
|---|---|---|
| JP | 2012-203072 A | 10/2012 |
| JP | 2016-75766 A | 5/2016 |

OTHER PUBLICATIONS

International Search Report (PCT/ISA/210) issued in PCT Application No. PCT/JP2018/011660 dated Jun. 5, 2018 with English translation (three (3) pages).

Japanese-language Written Opinion (PCT/ISA/237) issued in PCT Application No. PCT/JP2018/011660 dated Jun. 5, 2018 (three (3) pages).

\* cited by examiner

COMMUNICATION METHOD, SOUND GENERATION METHOD AND MOBILE COMMUNICATION TERMINAL

CROSS-REFERENCE TO RELATED APPLICATIONS

This application is a continuation of U.S. application Ser. No. 16/506,530 filed Jul. 9, 2019; which is continuation application filed under 35 U.S.C. § 111(a), of International Application No. PCT/JP2018/011660, filed on Mar. 23, 2018, which claims priority to Japanese Patent Application No. 2017-059040, filed on Mar. 24, 2017, the disclosures of which are incorporated by reference.

FIELD

The present invention relates to a sound generation device.

BACKGROUND

There has been a data recording device that records performance data and musical instrument setting data as to an electronic musical instrument. For example, Japanese Unexamined Patent Application Publication No. 2012-203072 discloses a data recording device that acquires, from an electronic musical instrument to which it is connected, performance data and setting data regarding the electronic musical instrument and records the performance data and the setting data.

SUMMARY

A sound generation device according to an embodiment of the present invention includes an identification unit configured to identify one mobile communication terminal from one or more mobile communication terminals capable of communicating, an acquisition unit configured to acquire setting data regarding generation of a sound or control of generation of a sound from identified one mobile communication terminal, and a sound generation unit configured to detect an operation on an operation unit and to output a sound on the basis of the operation thus detected and the setting data.

A game device according to an embodiment of the present invention includes the sound generation device according to the foregoing and a control unit controlling progress of a game, the operation unit receiving an operation of controlling the progress of the game.

A sound generation method according to an embodiment of the present invention includes identifying one mobile communication terminal from one or more mobile communication terminals capable of communicating, acquiring, from the one mobile communication terminal thus identified, setting data regarding generation of a sound or control of generation of a sound, and detecting an operation on an operation unit and outputting a sound on the basis of the operation thus detected and the setting data.

DESCRIPTION OF EMBODIMENTS

When musical instrument data is recorded in a recording medium such as a USB, it is impossible to load a user's performance data and setting data into a musical instrument without having the recording medium. Further, there is also a problem with a complicated operation of inserting a recording medium such as a USB into a musical instrument and loading performance data and setting data from the USB to the musical instrument.

According to an embodiment described below, a sound generation device and a sound generation system which can make it easy to apply setting data to a musical instrument are provided.

Sound generation devices according to embodiments of the present invention are described in detail below with reference to the drawings. The embodiments to be hereinafter described are examples of embodiments of the present invention, and the present invention is not limited to these embodiments.

Embodiment 1

A sound generation device and a sound generation system for configuring the settings for a musical instrument according to an embodiment of the present invention are described with reference to the drawings. A sound generation system according to an embodiment of the present invention includes a sound generation device including a setting device that configures the settings for a musical instrument and a mobile communication terminal, carried by a user, which stores therein setting data as to the musical instrument. The setting device, which configures the settings for a musical instrument, receives, from a mobile communication terminal, carried by a user, in which setting data for a musical instrument that the user normally uses is recorded in advance, the setting data for the musical instrument that the user uses, and configures the settings for the musical instrument on the basis of the setting data thus received. In an embodiment of the present invention, a mobile communication terminal may be a mobile terminal, such as a smartphone or a tablet, that is capable of communicating with an external device and that a user normally brings with him/her when going out.

[System]

Figure 1:
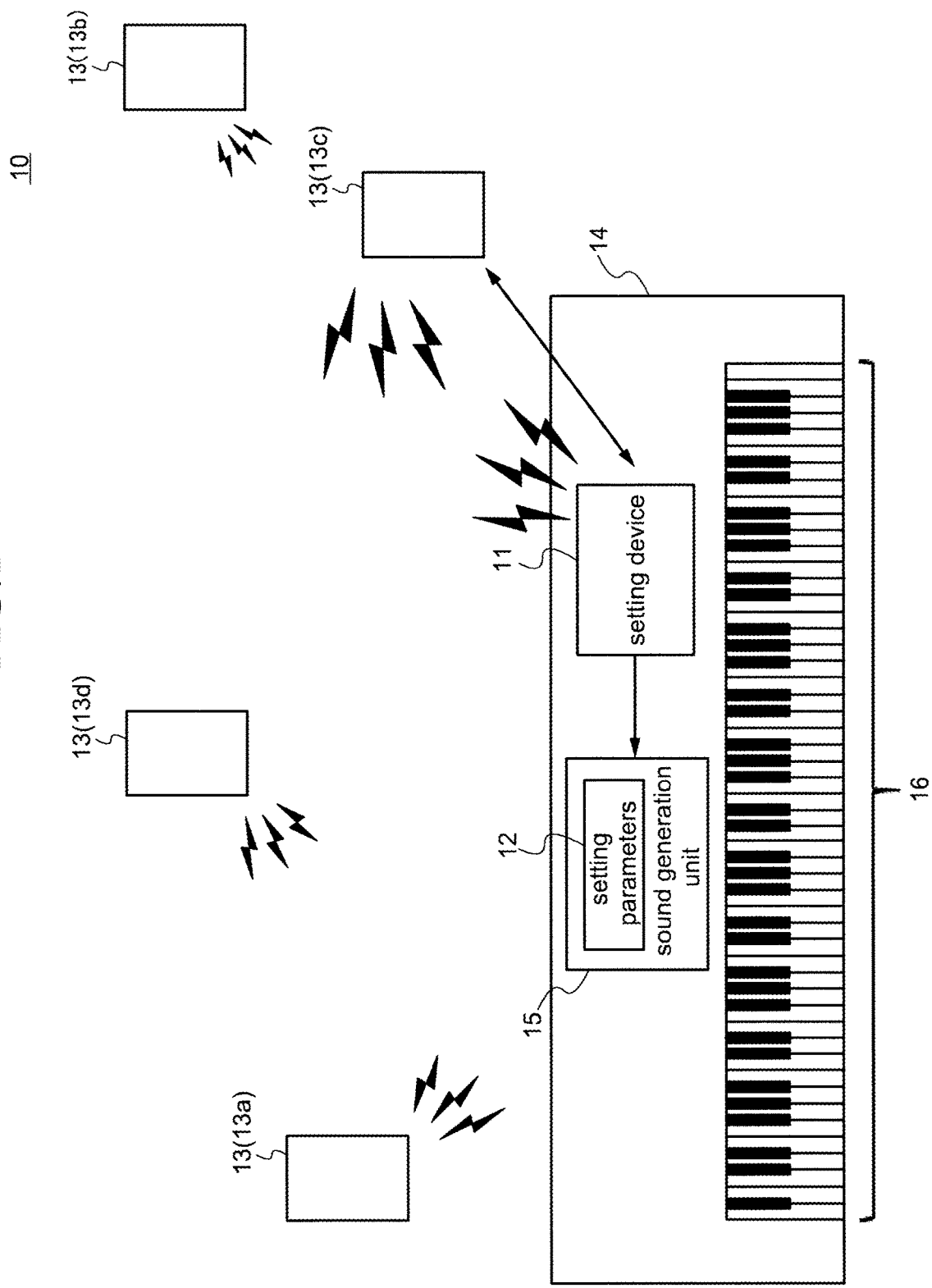
FIG. 1 is a block diagram showing a configuration of a sound generation system according to an embodiment of the present invention.

FIG. 1 is a schematic view showing a sound generation system 10 according to the present embodiment. The sound generation system 10 includes a sound generation device 14, a setting device 11 that configures the settings for control of generation of a sound by the sound generation device 14, and mobile communication terminals 13 capable of communicating with the setting device 11. For example, the sound generation device 14 may be an electronic musical instrument such as an electronic piano or a game device. In the present embodiment, as an example, a case where the sound generation device 14 is an electronic piano. The sound generation device 14 is hereinafter referred to as "musical instrument 14". The setting device 11 is contained in the musical instrument 14. The setting device 11 configures the settings a value for setting parameters 12 of a sound generation unit 15 contained in the musical instrument 14. The setting parameters 12 are tone parameters that are applied to the musical instrument 14 and parameters regarding a score, accompaniment data, and an applicable effector. The sound generation unit 15 outputs a sound on the basis of the settings values of the setting parameters 12 and the operation of an operator (in the present embodiment, a key of the musical instrument 14) 16 of the musical instrument 14 by a user of the musical instrument 14. For example, the musical instrument 14 produces a single sound each time the user (player) of the musical instrument 14 performs a single operation.

In the sound generation system 10 according to the present embodiment, the setting device 11, which configures the settings for control of generation of a sound of the musical instrument 14, communicates with a mobile communication terminal 13 that is highest in signal strength of one or more mobile communication terminals 13, located around the setting device 11, which are capable of communicating with the setting device 11. The term "signal strength" means the strength of radio waves from a mobile communication terminal 13 that are received by the setting device 11. For example, assume that, as shown in FIG. 1, mobile communication terminals 13a, 13b, 13c, and 13d capable of communicating with the setting device 11 are located around the setting device 11 and the mobile communication terminal 13c is closest in location to the setting device 11 among the mobile communication terminals 13a to 13d. In this case, the strength of a signal from the mobile communication terminal 13c that is received by the setting device 11 is higher than the strengths of signals from the mobile communication terminals 13a, 13b, and 13d that are received by the setting device 11. Therefore, the setting device 11 communicates with the mobile communication terminal 13c, which is highest in signal strength of the mobile communication terminals 13a to 13d.

The mobile communication terminals 13 (13a to 13d), which communicate with the setting device 11, have stored therein setting data for a musical instrument that users normally use. It should be noted that each of the mobile communication terminals 13 (13a to 13d) can store therein musical instrument setting data for a plurality of musical instruments. When a mobile communication terminal 13 has stored therein setting data for a plurality of musical instruments, setting data for each of the plurality of musical instruments is stored in association with its corresponding musical instrument. For example, setting data for a musical instrument include information regarding the tone parameters of a musical instrument that the user usually uses, a score, accompaniment data, and an applicable effector.

[Hardware]

Figure 2:
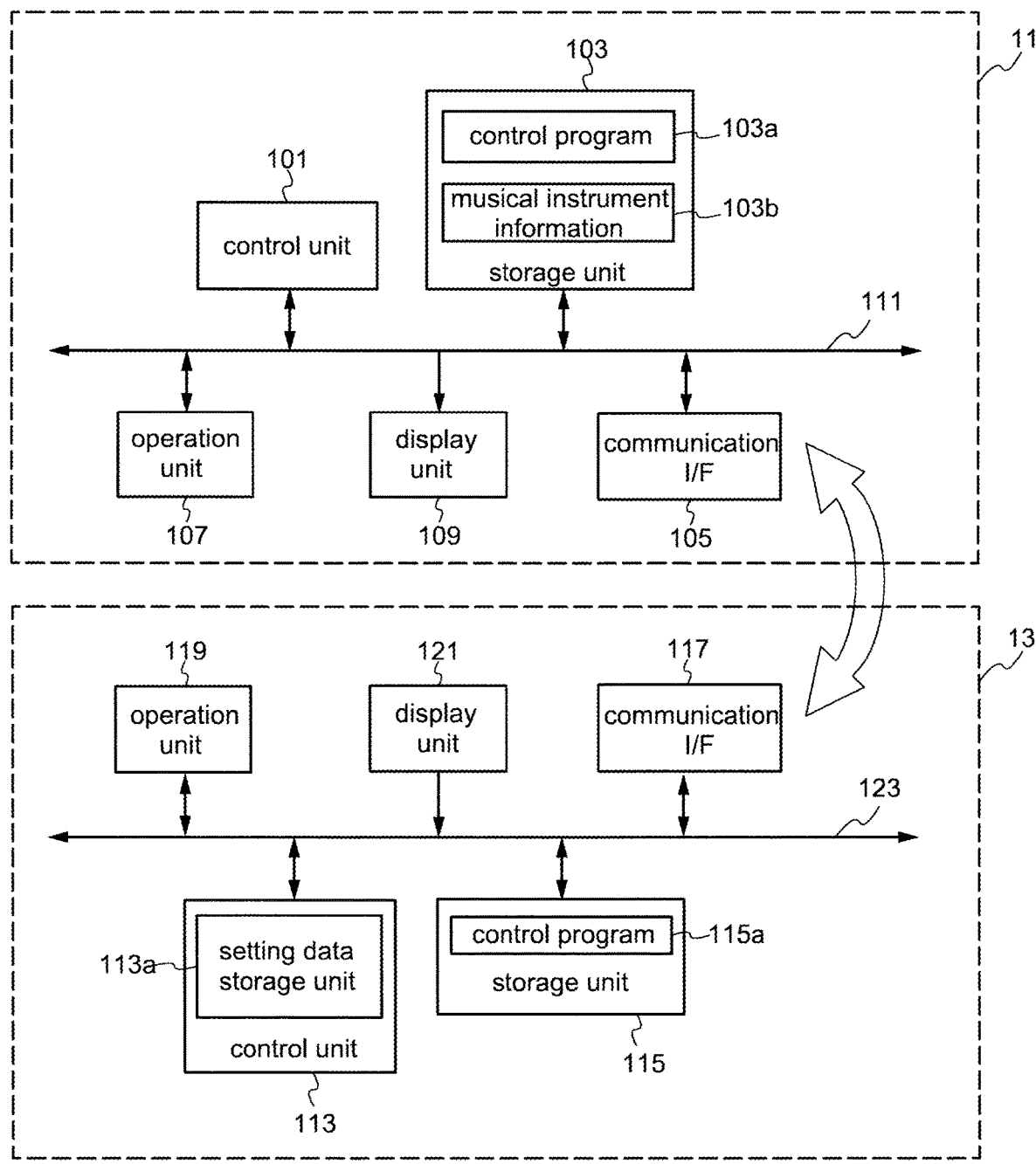
FIG. 2 is a block diagram showing a configuration of a sound generation device and a configuration of a mobile communication terminal according to an embodiment of the present invention.

FIG. 2 is a block diagram showing a configuration of the setting device 11 and a configuration of a mobile communication terminal 13 according to the present embodiment. The setting device 11 includes a control unit 101, a storage unit 103, a communication interface (a communication I/F) 105, and an operation unit 107. Further, the setting device 11 may optionally include a display unit 109. Each of these components is connected to the other via a bus 111. The mobile communication terminal 13 includes a control unit 113, a storage unit 115, a communication interface (a communication I/F) 117, and an operation unit 119. Further, the mobile communication terminal 13 may optionally include a display unit 121. Each of these components is connected to the other via a bus 123.

The configuration of the setting device 11 is described with reference to FIG. 2. The control unit 101 includes an arithmetic processing circuit such as a CPU. The control unit 101 uses the CPU to execute a control program 103a stored in the storage unit 103, whereby the setting device 11 achieves various functions in order to configure the settings for the musical instrument. The functions that are achieved include a musical instrument setting function.

The storage unit 103 is a storage device such as a nonvolatile memory or a hard disk. The storage unit 103 has stored therein the control program 103a for achieving the musical instrument setting function. The control program 103a may be provided in a state of having been stored in a computer-readable recording medium such as a magnetic recording medium, an optical recording medium, a magnetooptical recording medium, or a semiconductor memory. In this case, the setting device 11 needs only include a device that reads a recording medium. Alternatively, the control program 103a may be downloaded via a network such as the Internet. Further, the storage unit 103 has musical instrument information 103b stored therein. The musical instrument information 103b includes information indicating the type of the musical instrument. The information indicating the type of the musical instrument indicates information for identifying the type of the musical instrument such as the manufacturer of the musical instrument, the product name of the musical instrument, the model number, the product number, and the serial number.

The communication I/F 105 communicates with the mobile communication terminal 13 on the basis of control of the control unit 101. Further, the communication I/F 105 may be connected to a communication line such as the Internet or a LAN to communicate with an external device such as a server. It should be noted that the function of the storage unit 103 may be achieved by an external device capable of communicating by the communication I/F 105.

The operation unit 107 is a device such as an operation button, a keyboard, and a mouse provided on an operation panel, a remote controller, and the like, and outputs a signal corresponding to an input operation to the control unit 101. The user uses the operation unit 107 to give an instruction for communication with the mobile communication terminal 13. Further, the user may use the operation unit 107 to manually designate the settings for the musical instrument that he/she uses. Further, in addition to the settings for the musical instrument based on the setting data for the musical instrument received from the mobile communication terminal 13, the user of the musical instrument may configure additional settings via the operation unit 107.

The display unit 109 is a display device, such as a liquid crystal display or an organic EL display, on which a screen based on control by the control unit 101 is displayed to the user on the basis of control by the control unit 101. For example, on the display unit 109, the setting status of the musical instrument may be displayed.

Next, the configuration of the mobile communication terminal 13 is described with reference to FIG. 2. The control unit 113 includes an arithmetic processing circuit such as a CPU. The control unit 113 uses the CPU to execute a control program 115a stored in the storage unit 115, whereby the mobile communication terminal 13 achieves various functions in order to configure the settings for the musical instrument. The functions that are achieved include functions such as storage of setting data for a musical instrument and outputting of the setting data. The control unit 113 has a setting data storage unit 113a. The setting data storage unit 113a may be a rewritable memory and, for example, may be constituted of a RAM. The setting data storage unit 113a records and retains setting data for a musical instrument that the user normally uses. The control unit 113 causes the setting data storage unit 113a to record setting data for a musical instrument that the user normally uses and transmits the setting data stored in the setting data storage unit 113a to the setting device 11 at the time of communication with the setting device 11.

The storage unit 115 is a storage device such as a nonvolatile memory or a hard disk. The storage unit 115 has stored therein the control program 115a for achieving the musical instrument setting function. The control program 115a may be provided in a state of having been stored in a computer-readable recording medium such as a magnetic recording medium, an optical recording medium, a magnetooptical recording medium, or a semiconductor memory. In this case, the mobile communication terminal 13 needs only include a device that reads a recording medium. Alternatively, the control program 115a may be downloaded via a network such as the Internet.

The communication I/F 117 communicates with the setting device 11 on the basis of control of the control unit 113. Further, the communication I/F 117 may be connected to a communication line such as the Internet or a LAN to perform communication with an external device such as a server. It should be noted that the function of the storage unit 115 may be achieved by an external device capable of communicating by the communication I/F 117.

The operation unit 119 is a device such as an operation panel, an operation button, a keyboard, and a mouse, and outputs a signal corresponding to an input operation to the control unit 113. The user can activate an application used for setting the musical instrument through the operation unit 119. Further, in recording and retaining setting data for the musical instrument in the setting data storage unit 113a, the user can set a storage location and the like via the operation unit 119. Further, in a case where the setting data storage unit 113a of the mobile communication terminal 13 has stored therein setting data for a plurality of musical instruments, the user can select setting data to transmit to the setting device 11 via the operation unit 119.

The display unit 121 is a display device, such as a liquid crystal display or an organic EL display, on which a screen based on control by the control unit 113 is displayed to the user on the basis of control by the control unit 113.

[Setting Function]

The musical instrument setting function, which is achieved by the control unit 101 of the setting device 11 executing the control program 103a stored in the storage unit 103, is described. Further, the transmitting function of setting data for a musical instrument, which is achieved by executing the control program 115a stored in the storage unit 115 of the mobile communication terminal 13, is described. All or some of the components that achieve the setting function and the transmitting function of setting data to be hereinafter described may be achieved by hardware of the setting device 11 and the mobile communication terminal 13.

Figure 3:
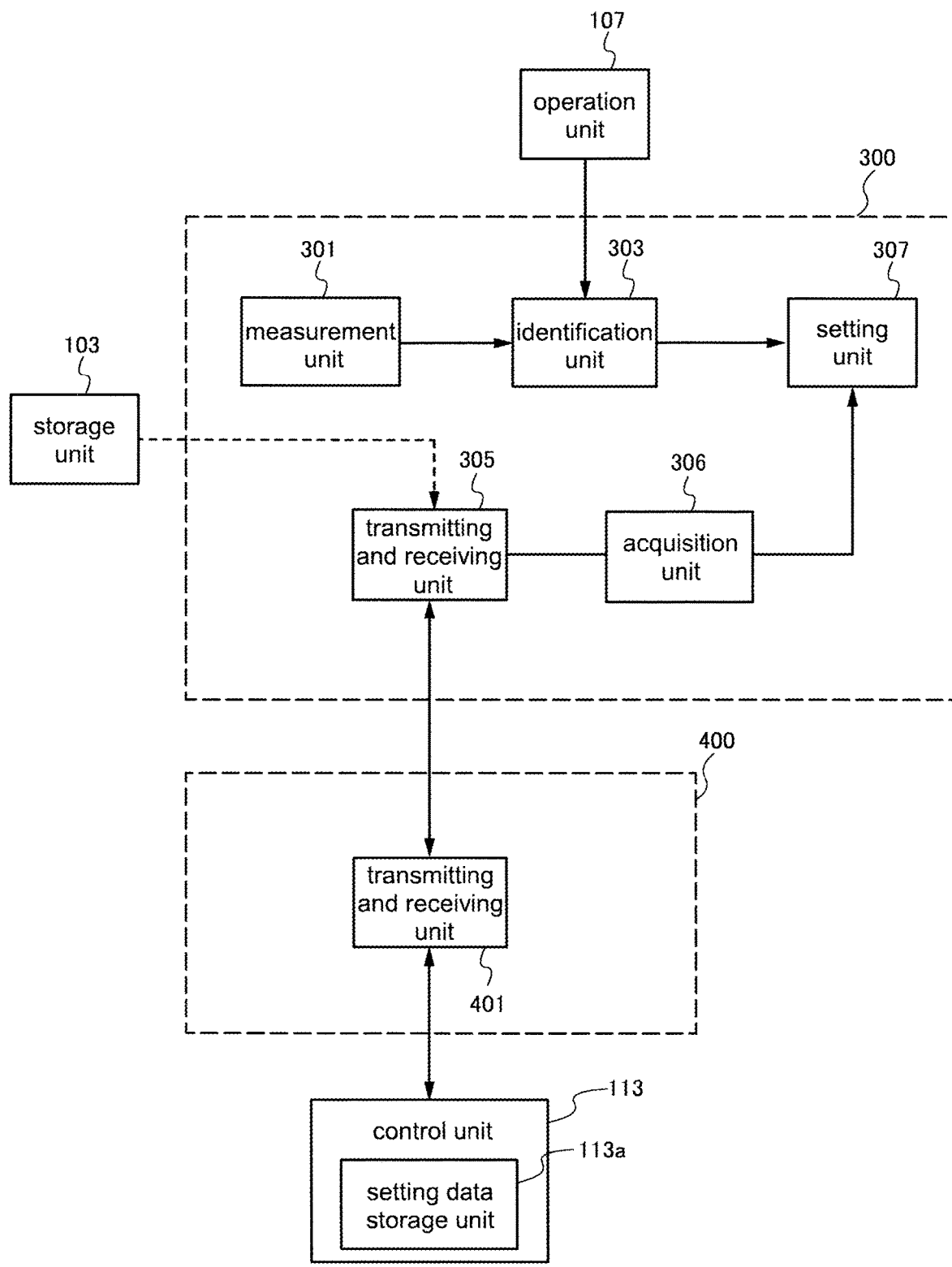
FIG. 3 is a block diagram showing a configuration of a setting function and a transmitting function according to an embodiment of the present invention.

FIG. 3 is a block diagram showing a configuration of a musical instrument setting function 300 and a setting data transmitting function 400 according to the present embodiment. As shown in FIG. 3, the setting function 300 includes a measurement unit 301, an identification unit 303, a transmitting and receiving unit 305, an acquisition unit 306, and a setting unit 307. Further, the setting data transmitting function 400 includes a transmitting and receiving unit 401. It should be noted that in FIG. 3, the transmitting function 400 represents a transmitting function that is executed by the mobile communication terminal 13c shown in FIG. 1.

The following describes the setting function 300. The measurement unit 301 measures the signal strengths of the mobile communication terminals 13a to 13d present around the setting device 11 and capable of communicating with the setting device 11. For example, the measurement unit 301 measures the RSSI (received signal strength indicator) of each of the mobile communication terminals 13a to 13d capable of communicating with the setting device 11.

The identification unit 303 acquires the signal strengths of the mobile communication terminals 13a to 13d as measured by the measurement unit 301 and, receiving an instruction from the user via the operation unit 107, identifies a mobile communication terminal to be communicated based on the signal strengths. Note here that the identification unit 303 identifies, as the mobile communication terminal to communicate with, a mobile communication terminal 13 having the highest signal strength of the mobile communication terminals 13a to 13d. As shown in FIG. 1, in a case where the mobile communication terminal 13c has the highest signal strength among the mobile communication terminals 13a to 13d, the identification unit 303 identifies the mobile communication terminal 13c, which has the highest signal strength among the mobile communication terminals 13a to 13d, as the mobile communication terminal to communicate with.

The transmitting and receiving unit 305 communicates with the mobile communication terminal 13c identified by the identification unit 303 and receives setting data regarding control of production of a sound of the musical instrument from the mobile communication terminal 13c. At this point in time, the transmitting and receiving unit 305 may transmit the musical instrument information 103b to the mobile communication terminal 13c identified by the identification unit 303. When the mobile communication terminal 13c has stored therein setting data for a plurality of musical instruments, the mobile communication terminal 13c selects setting data corresponding to the musical instrument information 103b based on the musical instrument information 103b received from the setting device 11 and transmits the selected setting data to the transmitting and receiving unit 305. The transmitting and receiving unit 305 transmits the setting data for the musical instrument received from the mobile communication terminal 13c to the acquisition unit 306. After having received the setting data for the musical instrument from the mobile communication terminal 13c, the transmitting and receiving unit 305 terminates communication with the mobile communication terminal 13c.

Examples of setting data include data that designates a tone to be used, data that makes it possible to identify accompaniment pattern data to be used, data that adjusts the volume of a part to be played or the volume of other parts, data that transposes the pitch at which the user plays, and the like. Further examples of the setting data include data that identifies a rule for generating an additional sound such as a harmony sound to the user's performance, data that identifies a rule of expression addition such as how a vibrato or a staccato is imparted to each sound of the user's performance, and the like. Further, the setting data include data that designates an effect, data that designates the performance tempo for the user, and the like. Among them, for example, the data regarding a tone, the data regarding an accompaniment pattern, the data regarding a rule for generating an additional sound, the data regarding a rule of expression addition, and the like are setting data regarding generation of a sound according to the user's performance operation. Meanwhile, the data regarding the volume, transposition, an effect, and the like is setting data that controls outputting of a sound according to the user's performance operation.

The acquisition unit 306 acquires the setting data regarding control of generation of a sound of the musical instrument as transmitted from the mobile communication terminal 13c via the transmitting and receiving unit 305. The acquisition unit 306 transmits the setting data thus acquired to the setting unit 307.

The setting unit 307 changes the settings for the musical instrument on the basis of the setting data for the musical instrument thus acquired. That is, the setting unit 307 changes a value of the setting parameters 12 contained in the musical instrument 14 on the basis of the setting data for the musical instrument thus acquired. When the user of the musical instrument 14 sets additional settings for the musical instrument 14 via the operation unit 107, the setting unit 307 may reflect the user's setting instruction input via the operation unit 107 in the setting parameters 12 of the musical instrument 14.

Next, the transmitting function 400 of the setting data is described. A mobile communication terminal 13 identified by the identification unit 303 of the setting function 300 as the mobile communication terminal to communicate with the setting device 11 transmits setting data for the musical instrument through the transmitting and receiving unit 401. In a case where the setting data storage unit 113a of the mobile communication terminal 13 has stored therein setting data for a plurality of musical instruments, the transmitting and receiving unit 401 receives the musical instrument information 103b from the setting device 11. The control unit 113 acquires the musical instrument information 103b from the transmitting and receiving unit 401 and selects setting data for a musical instrument corresponding to the musical instrument information 103b from the setting data for the plurality of the musical instruments. Further, although not illustrated, setting data to be transmitted to the setting device 11 may be selected via the operation unit 119 of the mobile communication terminal 13.

As mentioned above, in the setting device 11 according to the present embodiment, the transmitting and receiving unit 305 terminates communication with the mobile communication terminal 13c after having received the setting data for the musical instrument from the mobile communication terminal 13c. After having terminated communication with the mobile communication terminal 13c having transmitted setting data, the identification unit 303 of the setting device 11, receiving an instruction from the user via the operation unit 107, can identify a mobile communication terminal to be communicated next on the basis of the signal strengths, measured by the measurement unit 301, of the mobile communication terminals 13 capable of communicating with the setting device 11.

Figure 4A:
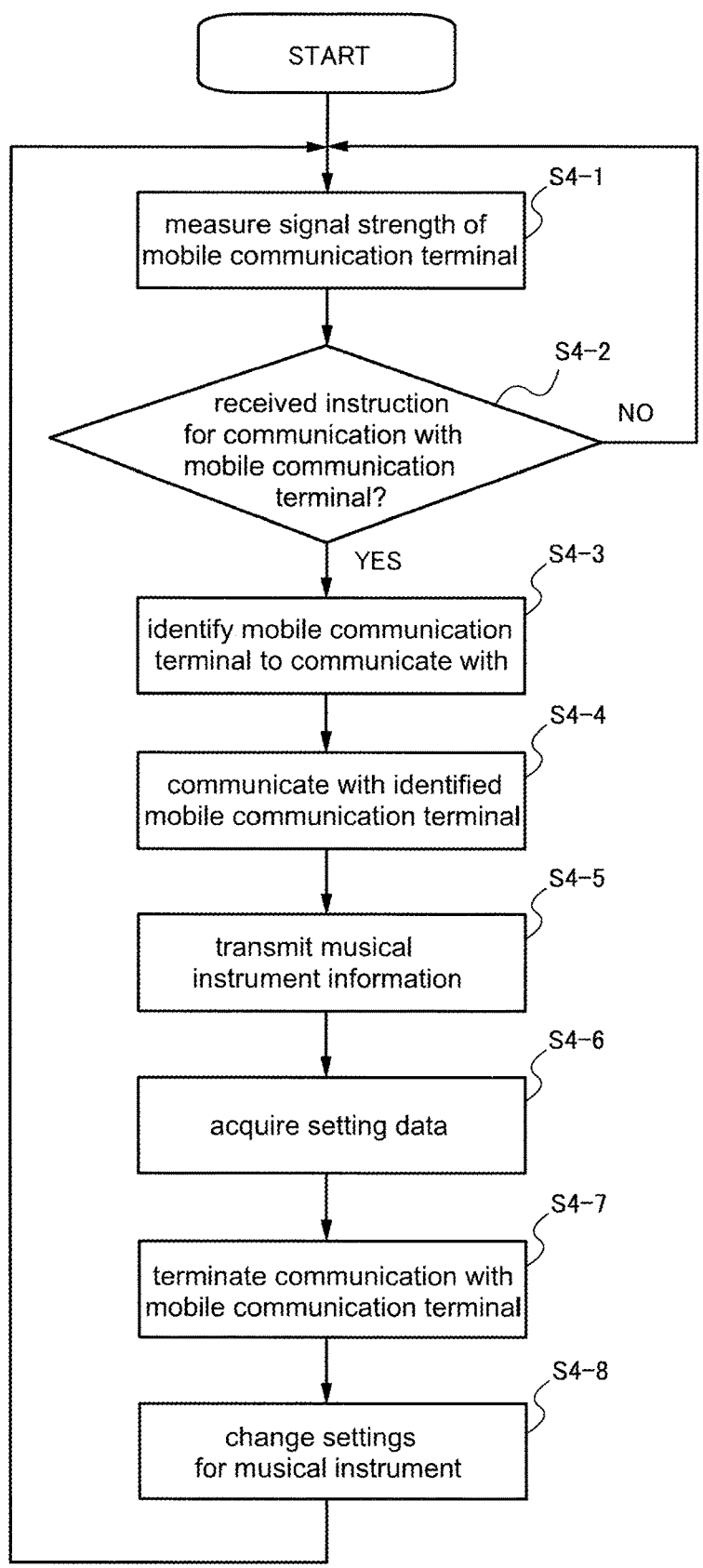
FIG. 4A is a flow chart showing steps of a musical instrument setting method according to an embodiment of the present invention.
Figure 4B:
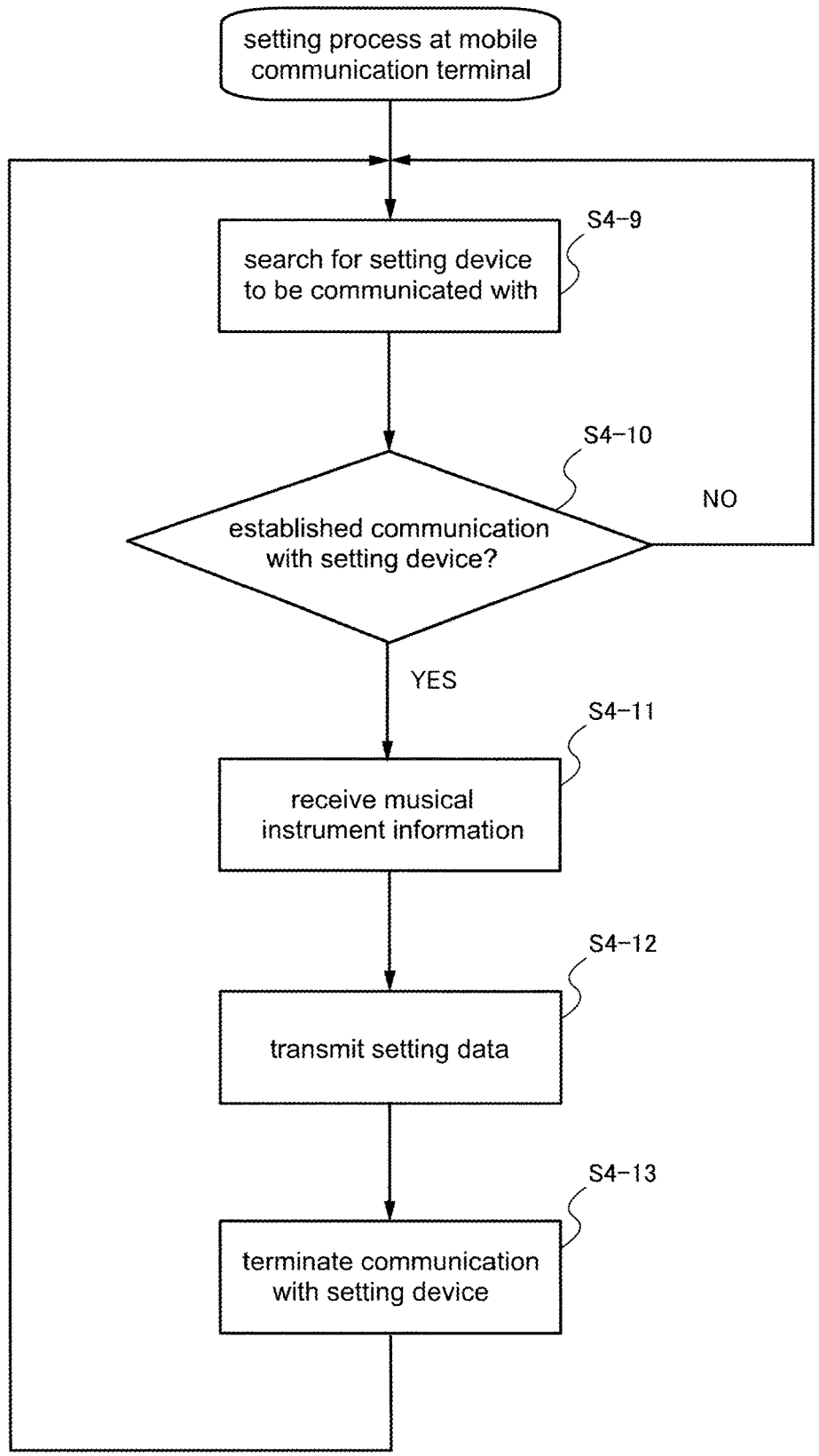
FIG. 4B is a flow chart showing steps of the musical instrument setting method according to an embodiment of the present invention.

FIG. 4A and FIG. 4B are flow charts showing steps of a musical instrument setting method that is executed by the sound generation system 10 according to the present embodiment. An example of the musical instrument setting method that is executed by the sound generation system 10 according to the present embodiment is described in detail below with reference to FIG. 4A and FIG. 4B.

FIG. 4A is a flow chart showing steps of the musical instrument setting method that are executed by the setting device 11. The steps of the musical instrument setting method that are executed by the setting device 11 are described with reference to FIG. 4A. First, the measurement unit 301 of the setting device 11 measures the signal strengths of mobile communication terminals capable of communicating with the setting device 11 (S4-1). For example, the measurement unit 301 measures the RSSI of each of the mobile communication terminals.

Next, upon receiving from the user via the operation unit 107 an instruction for communication with a mobile communication terminal 13 located therearound (S4-2), the identification unit 303 acquires the signal strengths, measured by the measurement unit 301, of mobile communication terminals 13 capable of communicating with the setting device 11 and identifies a mobile communication terminal to be communicated on the basis of the signal strengths thus acquired (S4-3).

Once the mobile communication terminal 13 to be communicated is identified by the identification unit 303, the setting device 11 and the identified mobile communication terminal 13 communicate with each other (S4-4). The setting device 11 transmits the musical instrument information 103b to the mobile communication terminal 13 via the transmitting and receiving unit 305 during communication (S4-5). Then, the setting device 11 acquires setting data for a musical instrument corresponding to the musical instrument information 103b thus transmitted from the mobile communication terminal 13 via the transmitting and receiving unit 305 (S4-6). It should be noted that in a case where the mobile communication terminal 13 has stored therein only setting data corresponding to the musical instrument 14 containing the setting device 11, step S4-5 may be omitted.

Upon receiving the setting data from the mobile communication terminal 13, the setting device 11 terminates communication with the mobile communication terminal 13 (S4-7). Then, the setting unit 307 changes the settings for the musical instrument on the basis of the setting data thus received (S4-8). It should be noted that the order of steps S4-7 and S4-8 may be reversed. Once communication with the mobile communication terminal 13 is terminated and the setting parameters 12 of the musical instrument 14 are changed, the setting device 11 returns to step S4-1.

FIG. 4B is a flow chart showing steps of the musical instrument setting method that are executed by a mobile communication terminal 13. The steps of the musical instrument setting method that are executed by a mobile communication terminal 13 are described with reference to FIG. 4B. A mobile communication terminal 13 searches for a communicable setting device (S4-9). Note here that the mobile communication terminal 13 can search for a communicable setting device by activating an application that is used to set a musical instrument. This application that is used to set a musical instrument may be installed in the mobile communication terminal 13 or may be downloaded via a network such as the Internet.

As mentioned above, in response to a communication instruction given from the user via the operation unit 107, the setting device 11 identifies a mobile communication terminal 13 to be communicated from mobile communication terminals 13 capable of communicating with the setting device 11 on the basis of their signal strengths. The mobile communication terminal 13 identified by the identification unit 303 of the setting device 11 communicates with the setting device 11 (S4-10). Note here that a mobile communication terminal 13 that is not identified by the identification unit 303 of the setting device 11 as a mobile communication terminal to communicate with the setting device 11 returns to step S4-9.

The mobile communication terminal 13 communicated with the setting device 11 receives the musical instrument information 103b from the setting device 11 (S4-11). The mobile communication terminal 13 selects setting data for a musical instrument corresponding to the musical instrument information 103b thus received and transmits it to the setting device 11 via the transmitting and receiving unit 401 (S4-12). It should be noted that if the mobile communication terminal 13 which communicates with the setting device 11 has stored therein only setting data corresponding to the musical instrument 14 containing the setting device 11, step S4-11 may be omitted.

After having transmitted the setting data corresponding to the musical instrument 14 to the setting device 11, the mobile communication terminal 13 terminates communication with the setting device 11 (S4-13). After having terminated communication with the setting device 11, the mobile communication terminal 13 returns to step S4-9.

As mentioned above, the sound generation device and the sound generation system for configuring the settings for a musical instrument according to the present embodiment can apply setting data, which the user normally applies to a musical instrument, to a musical instrument without the users individually performing setting operations when each user uses the musical instrument.

Embodiment 2

Another sound generation device and another sound generation system for configuring the settings for a musical instrument according to an embodiment of the present invention are described with reference to the drawings. The identification unit 303 of the setting device 11 according to the first embodiment described above identifies a mobile communication terminal 13 having the highest signal strength of communicable mobile communication terminals 13 located around the setting device 11 as a mobile communication terminal to be communicated. In the sound generation device and the sound generation system according to the present embodiment, a mobile communication terminal to be communicated with a setting device contained in the sound generation device is determined by mobile communication terminals, located around the setting device, which are capable of communicating with the setting device.

[System]

Figure 5:
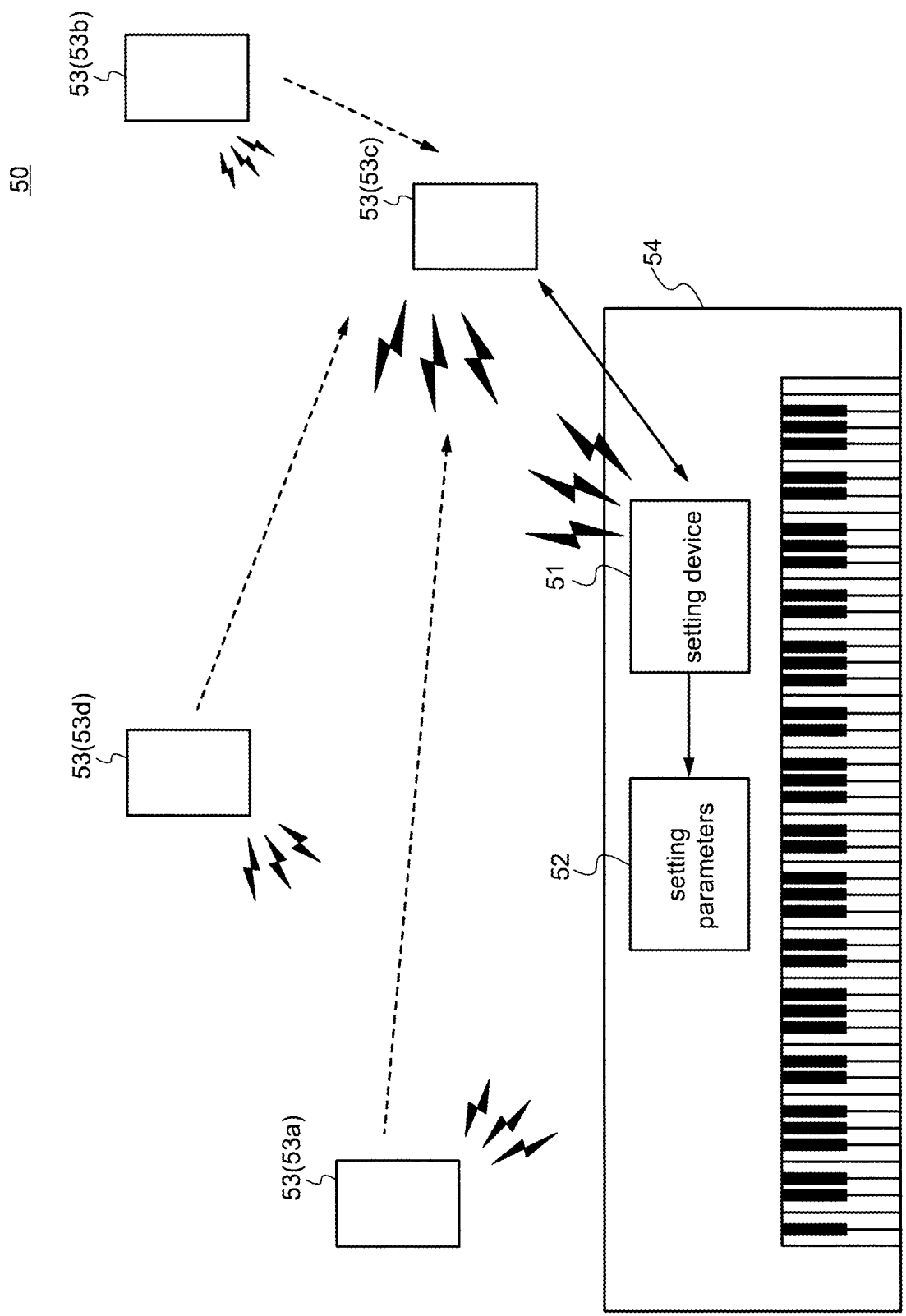
FIG. 5 is a block diagram showing a configuration of a sound generation system according to another embodiment of the present invention.

FIG. 5 is a schematic view showing a sound generation system 50 for configuring the settings for a musical instrument according to an embodiment of the present invention. The sound generation system 50 includes a musical instrument 54, a setting device 51 which is contained in the musical instrument 54, and configures the settings for control of generation of a sound of the musical instrument, and mobile communication terminals 53 capable of communicating with the setting device 51. The setting device 51 configures the settings a value of setting parameters 52 contained in the musical instrument 54. A detailed description of the sound generation system 50 according to the present embodiment is omitted, as it is substantially the same as the sound generation system 10 according the first embodiment described above except that a mobile communication terminal to be communicated with the setting device 51 is determined by the mobile communication terminals 53, located around the setting device 51, that are capable of communicating with the setting device 51. Further, a detailed description of the setting device 51 and a mobile communication terminal 53 is omitted, as they are substantially the same in configuration as the setting device 11 and a mobile communication terminal 13 according to the first embodiment described with reference to FIG. 2.

[Setting Function]

The musical instrument setting function, which is achieved by the control unit of the setting device 51 executing the control program stored in the storage unit, is described. Further, the transmitting function of setting data for a musical instrument, which is achieved by executing the control program 115a stored in the storage unit 115 of a mobile communication terminal 53, is described. All or some of the components that achieve the setting function to be hereinafter described may be achieved by hardware of the setting device 51 and the mobile communication terminal 53.

Figure 6:
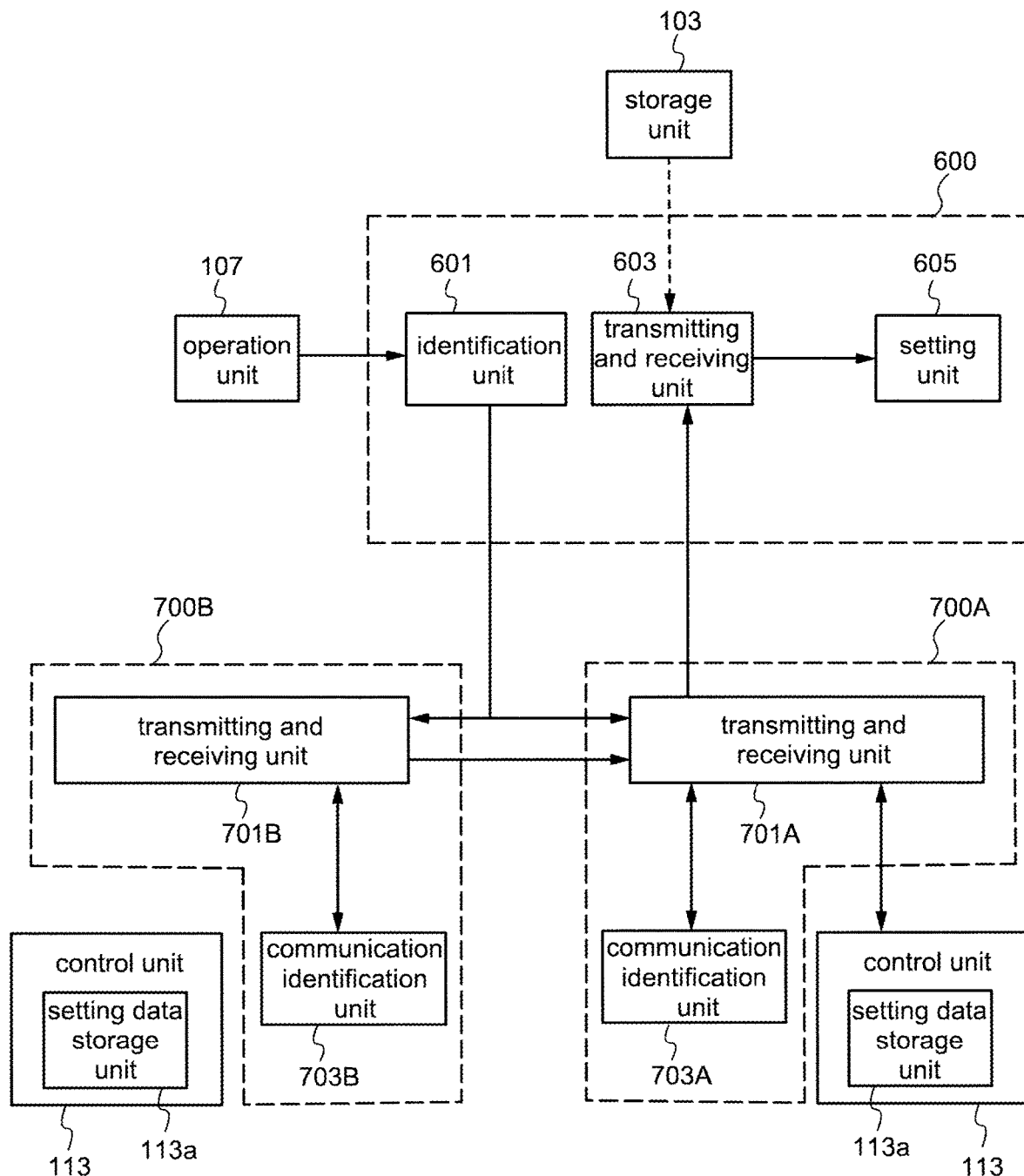
FIG. 6 is a block diagram showing a configuration of a setting function and a transmitting function according to another embodiment of the present invention.

FIG. 6 is a block diagram showing a configuration of a musical instrument setting function 600 and a setting data transmitting function 700 of a musical instrument according to the present embodiment. As shown in FIG. 6, the setting function 600 includes an identification unit 601, a transmitting and receiving unit 603, and a setting unit 605. Further, the setting data transmitting function 700 (700A, 700B) includes a transmitting and receiving unit 701 (701A, 701B) and a communication identification unit 703 (703A, 703B). In FIG. 6, the transmitting function 700A represents a transmitting function that is executed by the mobile communication terminal 53c shown in FIG. 5, and the transmitting function 700B represents a transmitting function that is executed by the mobile communication terminals 53a, 53b, and 53d shown in FIG. 5.

The identification unit 601 causes the mobile communication terminals 53a to 53d present around the setting device 51 and capable of communicating with the setting device 51 to identify a mobile communication terminal to be communicated with the setting device 51. Specifically, in accordance with an instruction given from the user via the operation unit 107 of the setting device 51, the identification unit 601 transmits, to the mobile communication terminals 53a to 53d present around the setting device 51 and capable of communicating with the setting device 51, a signal for causing the mobile communication terminals 53a to 53d to identify a mobile communication terminal to be communicated with the setting device 51. It should be noted that the signal may contain information that designates a representative mobile communication terminal from the mobile communication terminals 53a to 53d. The term "representative mobile communication terminal" here refers to any of the mobile communication terminals 53a to 53d that identifies a mobile communication terminal to be communicated with the setting device 51 from the mobile communication terminals 53a to 53d. The identification unit 601 may arbitrarily designate any of the mobile communication terminals 53a to 53d as a representative mobile communication terminal.

The mobile communication terminals 53a to 53d identify a mobile communication terminal to be communicated with the setting device 51 in accordance with the signal transmitted from the identification unit 601. Note here that upon receiving the signal transmitted from the identification unit 601, the mobile communication terminals 53a to 53d identify a mobile communication terminal to be communicated with the setting device 51 on the basis of the signal strengths of the mobile communication terminals 53a to 53d with respect to the setting device 51. The signal strength with respect to the setting device 51 is the signal strength at which the signal transmitted from the identification unit 601 of the setting device 51 is received by each of the mobile communication terminals 53a to 53d. Note here that the signal strength may be RSSI.

When the signal transmitted from the identification unit 601 contains information that designates a representative mobile communication terminal, the representative mobile communication terminal identifies a mobile communication terminal to be communicated with the setting device 51 from the mobile communication terminals 53a to 53d. Each of the mobile communication terminals 53a to 53d can determine whether or not the signal transmitted from the identification unit 601 designates the own as a representative mobile terminal by the identification unit 703 (703A, 703B) of the own. The following describes a case where the signal transmitted from the identification unit 601 contains information that designates the mobile communication terminal 53c as a representative mobile communication terminal. In response to the signal transmitted from the identification unit 601, the mobile communication terminals 53a, 53b, and 53d transmit the signal strengths of the mobile communication terminals 53a, 53b, and 53d with respect to the setting device 51 through the transmitting and receiving units 701B to the transmitting and receiving unit 701A of the mobile communication terminal 53c designated as a representative mobile communication terminal.

The mobile communication terminal 53c receives the signal strengths of the mobile communication terminals 53a, 53b, and 53d with respect to the setting device 51 through the transmitting and receiving unit 701A and transmits them to the communication identification unit 703A. The communication identification unit 703A of the mobile communication terminal 53c compares the signal strengths of the mobile communication terminals 53a, 53b, and 53d with respect to the setting device 51 thus acquired with the signal strength of the mobile communication terminal 53c with respect to the setting device 51 and identifies a mobile communication terminal having the highest signal strength with respect to the setting device 51 as the mobile communication terminal supposed to communicate with the setting device 51. Assume here that, as shown in FIG. 5, the mobile communication terminal 53c has the highest signal strength with respect to the setting device 51 among the mobile communication terminals 53a to 53d. Accordingly, the communication identification unit 703A of the mobile communication terminal 53c identifies the mobile communication terminal 53c as a mobile communication terminal having the highest signal strength with respect to the setting device 51.

Once the mobile communication terminal 53c is identified as the mobile communication terminal to be communicated with the setting device 51, the setting device 51 and the mobile communication terminal 53c communicates with each other. The transmitting and receiving unit 603 of the setting device 51 communicates with the mobile communication terminal 53c to receive setting data for a musical instrument from the mobile communication terminal 53c. At this point in time, the transmitting and receiving unit 603 may transmit the musical instrument information 103b to the mobile communication terminal 53c. When the setting data storage unit 113a of the mobile communication terminal 53c has stored therein setting data for a plurality of musical instruments, the mobile communication terminal 53c selects, on the basis of the musical instrument information 103b received from the setting device 51, setting data for a musical instrument corresponding to the musical instrument information 103b and transmits the setting data for the musical instrument thus selected to the transmitting and receiving unit 603 of the setting device 51. The transmitting and receiving unit 603 transmits the setting data for the musical instrument received from the mobile communication terminal 53c to the setting unit 605. After having received the setting data for the musical instrument from the mobile communication terminal 53c, the transmitting and receiving unit 603 terminates communication with the mobile communication terminal 53c.

The setting unit 605 changes the settings for the musical instrument on the basis of the setting data for the musical instrument thus acquired. That is, the setting unit 605 changes the setting parameters 52 on the basis of the setting data for the musical instrument thus acquired. In a case where a user of the musical instrument 54 configures additional settings for the musical instrument 54 via the operation unit 107, the setting unit 605 may reflect the user's setting instruction inputted via the operation unit 107 in the setting parameters 52 of the musical instrument 54.

As mentioned above, in the setting device 51 according to the present embodiment, the transmitting and receiving unit 603 terminates communication with the mobile communication terminal 53c after having received the setting data for the musical instrument from the mobile communication terminal 53c. After having terminated communication with the mobile communication terminal 53c having transmitted setting data, the identification unit 601 of the setting device 51, receiving an instruction from the user via the operation unit 107, can transmit, to mobile communication terminals present around the setting device 51 and capable of communicating with the setting device 51, a signal for causing the mobile communication terminals to identify a mobile communication terminal to be communicated with the setting device 51.

The foregoing has described a case where a signal which is transmitted from the identification unit 601 of the setting device 51 to the mobile communication terminals 53a to 53d contains information that designates a representative mobile communication terminal. However, this is not intended to limit the present embodiment. Each of the mobile communication terminals 53a to 53d present around the setting device 51 may identify a mobile communication terminal to be communicated with the setting device 51 on the basis of the signal strengths of the mobile communication terminals 53a to 53d with respect to the setting device 51.

For example, upon receiving a signal from the identification unit 601 of the setting device 51, the mobile communication terminal 53a transmits the signal strength of the own with respect to the setting device 51 to the other mobile communication terminals 53*b* to 53*d* via the transmitting and receiving unit 701 (701B). Similarly, the mobile communication terminal 53*b* transmits the signal strength of the own with respect to the setting device 51 to the other mobile communication terminals 53*a*, 53*c*, and 53*d* via the transmitting and receiving unit 701 (701B). Similarly, the mobile communication terminal 53*c* transmits the signal strength of the own with respect to the setting device 51 to the other mobile communication terminals 53*a*, 53*b*, and 53*d* via the transmitting and receiving unit 701 (701A), and the mobile communication terminal 53*d* transmits the signal strength of own with respect to the setting device 51 to the other mobile communication terminals 53*a* to 53*c* via the transmitting and receiving unit 701 (701B).

The communication identification unit 703 (703A, 703B) of each of the mobile communication terminals 53*a* to 53*d* compares the signal strengths of the mobile communication terminals 53*a* to 53*d* with respect to the setting device 51 and identifies a mobile communication terminal having the highest signal strength with respect to the setting device 51 as a mobile communication terminal to be communicated with the setting device 51. The mobile communication terminal thus identified communicates with the setting device 51 to transmit setting data corresponding to the musical instrument 54 to the setting device 51.

Figure 7A:
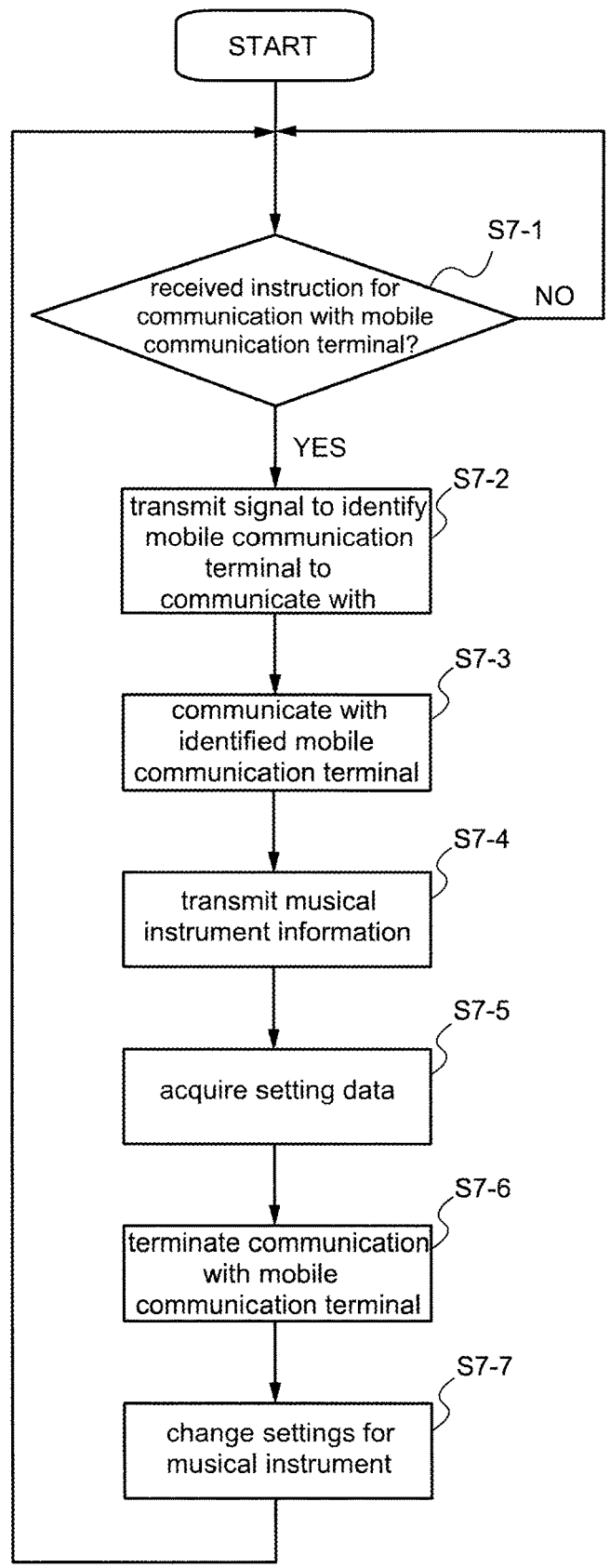
FIG. 7A is a flow chart showing steps of a musical instrument setting method according to another embodiment of the present invention.
Figure 7B:
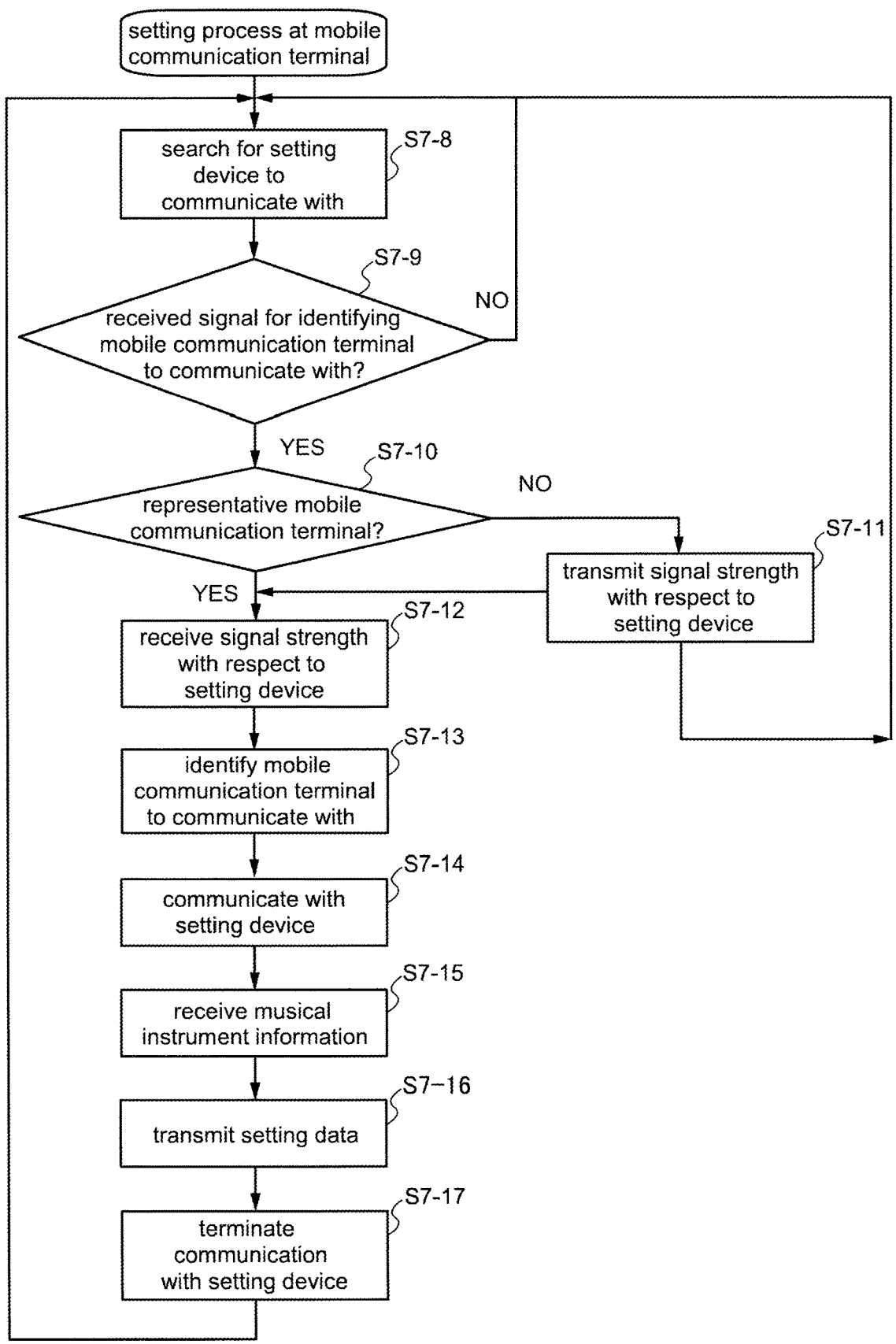
FIG. 7B is a flow chart showing steps of the musical instrument setting method according to another embodiment of the present invention.

FIG. 7A and FIG. 7B are flow charts showing steps of a musical instrument setting method that is executed by the sound generation system 50 according to the present embodiment. An example of the musical instrument setting method that is executed by the sound generation system 50 according to the present embodiment is described in detail below with reference to FIG. 7A and FIG. 7B.

FIG. 7A is a flow chart showing steps of the musical instrument setting method that are executed by the setting device 51. The setting device 51 receives an instruction for communication with a mobile communication terminal 53 located therearound from the user via the operation unit 107 (S7-1). Upon receiving the instruction for communication with a mobile communication terminal 53, the identification unit 601 transmits, to the mobile communication terminals 53*a* to 53*d* capable of communicating with the setting device 51, a signal for identification of a mobile communication terminal to be communicated with the setting device 51 (S7-2). Note here that the signal may contain information that designates a representative mobile communication terminal from the mobile communication terminals 53*a* to 53*d*. In accordance with the signal, a mobile communication terminal to be communicated with the setting device 51 is identified from the mobile communication terminals 53*a* to 53*d*, located around the setting device 51, which are capable of communicating with the setting device 51.

Once the mobile communication terminal 53 to be communicated with the setting device 51 is identified, the setting device 51 and the mobile communication terminal 53 thus identified communicate with each other (S7-3). The setting device 51 transmits the musical instrument information 103*b* to the mobile communication terminal 53 via the transmitting and receiving unit 603 during communication (S7-4). Then, the setting device 51 acquires setting data for a musical instrument corresponding to the musical instrument information 103*b* thus transmitted from the mobile communication terminal 53 via the transmitting and receiving unit 603 (S7-5). It should be noted that in a case where the mobile communication terminal 53 has stored therein only setting data corresponding to the musical instrument 54 containing the setting device 51, step S7-4 may be omitted.

Upon receiving the setting data from the mobile communication terminal 53, the setting device 51 terminates communication with the mobile communication terminal 53 (S7-6). Then, the setting unit 605 changes the settings for the musical instrument 54 on the basis of the setting data thus received (S7-7). It should be noted that the order of steps S7-6 and S7-7 may be reversed. Once communication with the mobile communication terminal 53 is terminated and the setting parameters 52 of the musical instrument 54 are changed, the setting device 51 returns to step S7-1.

FIG. 7B is a flow chart showing steps of the musical instrument setting method that are executed by a mobile communication terminal 53. The steps of the musical instrument setting method that are executed by a mobile communication terminal 53 are described with reference to FIG. 7B.

A mobile communication terminals 53 search for a communicable setting device (S7-8). Note here that the mobile communication terminals 53 can search for a communicable setting device by activating an application that is used to set a musical instrument. This application that is used to set a musical instrument may be installed in the mobile communication terminal 53 or may be downloaded via a network such as the Internet.

As mentioned above, when the setting device 51 receives from the user via the operation unit 107 an instruction for communication with a mobile communication terminal, the identification unit 601 of the setting device 51 transmits a signal for causing mobile communication terminals 53 to identify a mobile communication terminal to be communicated with the setting device 51. Note here that the signal contains information that designates a predetermined mobile communication terminal 53 as a representative mobile communication terminal. When the mobile communication terminals 53 receives the signal from the identification unit 601 (S7-9), the communication identification unit 703 of each of the mobile communication terminals 53 checks, on the basis of the signal thus received, whether the own terminal is designated as a representative mobile communication terminal (S7-10). A mobile communication terminal 53 which is not designated as a representative mobile communication terminal transmits the signal strength of the own terminal with respect to the setting device 51 to a mobile communication terminal 53 designated as a representative mobile communication terminal (S7-11). The mobile communication terminal 53 designated as a representative mobile communication terminal receives the signal strength with respect to the setting device 51 of another mobile communication terminal 53 which is not designated as a representative mobile communication terminal (S7-12).

The mobile communication terminal 53 designated as a representative mobile communication terminal identifies, on the basis of the signal strengths with respect to the setting device 51 of all mobile communication terminals 53, including the own terminal, that are capable of communicating with the setting device 51, a mobile communication terminal to be communicated with the setting device 51 (S7-13). Specifically, the communication identification unit 703 of the mobile communication terminal 53 designated as a representative mobile communication terminal compares the signal strengths with respect to the setting device 51 of all mobile communication terminals 53 including the own terminal and, as a result of the comparison, identifies a mobile communication terminal 53 having the highest signal strength with respect to the setting device 51 as the mobile communication terminal to be communicated with the setting device 51.

The mobile communication terminal 53 identified as the mobile communication terminal to be communicated with the setting device 51 and the setting device 51 communicate with each other (S7-14). The mobile communication terminal 53 receives the musical instrument information 103*b* from the setting device 51 (S7-15), selects setting data for a musical instrument corresponding to the musical instrument information 103*b* thus received, and transmits the setting data for the musical instrument thus selected to the transmitting and receiving unit 603 of the setting device 51 (S7-16). It should be noted that in a case where the mobile communication terminal 53 has stored therein only setting data corresponding to the musical instrument 54 containing the setting device 51, step S7-15 may be omitted.

After having transmitted the setting data corresponding to the musical instrument 54 to the setting device 51, the mobile communication terminal 53 terminates communication with the setting device 51 (S7-17). After having terminated communication with the setting device 51, the mobile communication terminal 53 returns to step S7-8. It should be noted that a mobile communication terminal 53 which was not designated as a representative mobile communication terminal returns to step S7-8 after having transmitted the signal strength of the own with respect to the setting device 51 to the mobile communication terminal 53 designated as a representative mobile communication terminal.

It should be noted that in a case where a signal, transmitted from the identification unit 601 of the setting device 51, for identification of a mobile communication terminal to be communicated with the setting device 51 does not contain information that designates a predetermined mobile communication terminal 53 as a representative mobile communication terminal, step S7-10 is omitted. In this case, each of all mobile communication terminals 53 having received the signal transmitted from the setting device 51 transmits the signal strengths of the own terminal with respect to the setting device 51 to the other mobile communication terminals 53. Then, all mobile communication terminals 53 compare the signal strength of the own terminal with respect to the setting device 51 with the signal strengths of the other mobile communication terminals 53 with respect to the setting device 51 thus received and identify a mobile communication terminal 53 having the highest signal strength with respect to the setting device 51 as a mobile communication terminal to be communicated with the setting device 51.

As mentioned above, the sound generation device and the sound generation system for configuring the settings for a musical instrument according to the present invention can apply setting data, which the user normally applies to a musical instrument, to a musical instrument without the users individually performing setting operations when each user uses the musical instrument.

Embodiment 3

The first and second embodiments have described an example wherein, when the setting device communicates with a mobile communication terminal, the setting device identifies a mobile communication terminal to be communicated with or transmits, to a mobile communication terminal, a signal for identification of a mobile communication terminal to be communicated with in accordance with an instruction from the user via the operation unit 107. However, this is not the only way to identify a mobile communication terminal to be communicated with. For example, the setting device may automatically identify a mobile communication terminal to be communicated with or transmit, to a mobile communication terminal, a signal for identification of a mobile communication terminal to be communicated with without an instruction given from the user.

[System]

Figure 8:
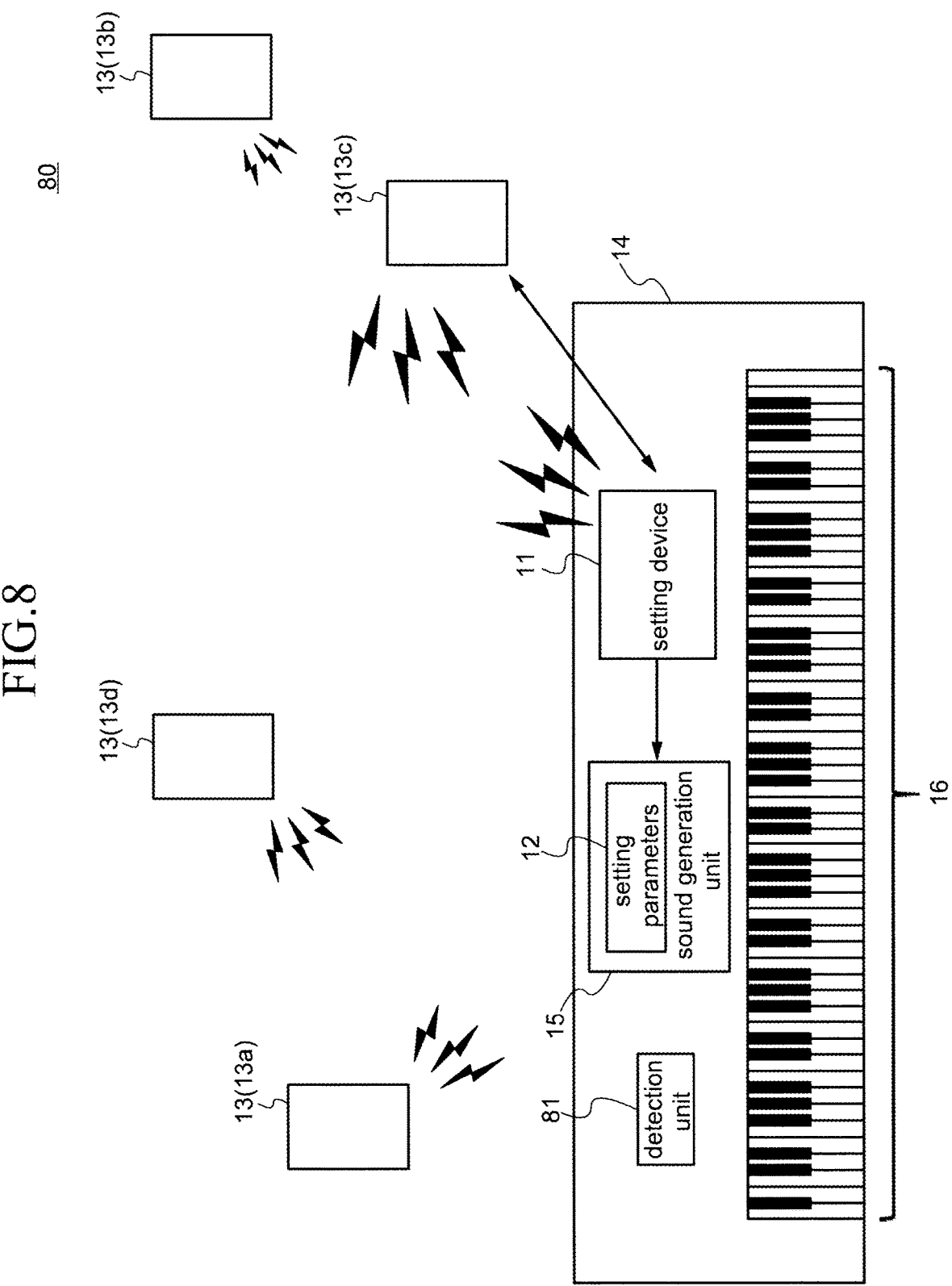
FIG. 8 is a block diagram showing a configuration of a sound generation system according to another embodiment of the present invention.

FIG. 8 is a schematic view showing a sound generation system 80 for configuring the settings for a musical instrument according to an embodiment of the present invention. In FIG. 8, components which are identical or similar to those of the sound generation system 10 according to the first embodiment described above are given the same reference signs as those of the sound generation system 10 shown in FIG. 1, and a repeated description thereof is omitted. The sound generation system 80 includes a setting device 11, contained in a musical instrument 14, that configures the settings for control of generation of a sound of the musical instrument and mobile communication terminals 13 (13*a* to 13*d*) capable of communicating with the setting device 11. The setting device 11 configures the settings for setting parameters 12 of a sound generation unit 15 contained in the musical instrument 14. In the present embodiment, the musical instrument 14 includes a detection unit 81. The detection unit 81 detects whether the musical instrument 14 currently has an effective player (user), i.e. detects the presence or absence of a current player of the musical instrument 14. The detection unit 81 may detect the presence or absence of a current player of the musical instrument 14 by detecting the presence of a user in a predetermined position in the area around the musical instrument 14. The term "predetermined position" refers to a region where the player usually is in playing the musical instrument 14 and a region where he/she is able to play the musical instrument 14. It should be noted that this region varies according to the type of musical instrument. Having detected the presence of a user in a region where he/she is able to play a musical instrument can mean that the user is in the right position for playing the musical instrument. The detection unit 81 may be a camera that takes an image of the predetermined position or a sensor that detects the presence or absence of a user. Alternatively, the detection unit 81 may detect the presence or absence of a current player of the musical instrument 14 by detecting the continuation of a state where a mobile communication terminal possessed by a user is capable of communicating with the setting device 11.

A detailed description of the setting device 11 and a mobile communication terminal 13 is omitted, as they are substantially the same in configuration as the setting device 11 and a mobile communication terminal 13 according to the first embodiment described with reference to FIG. 2.

[Setting Function]

Figure 9:
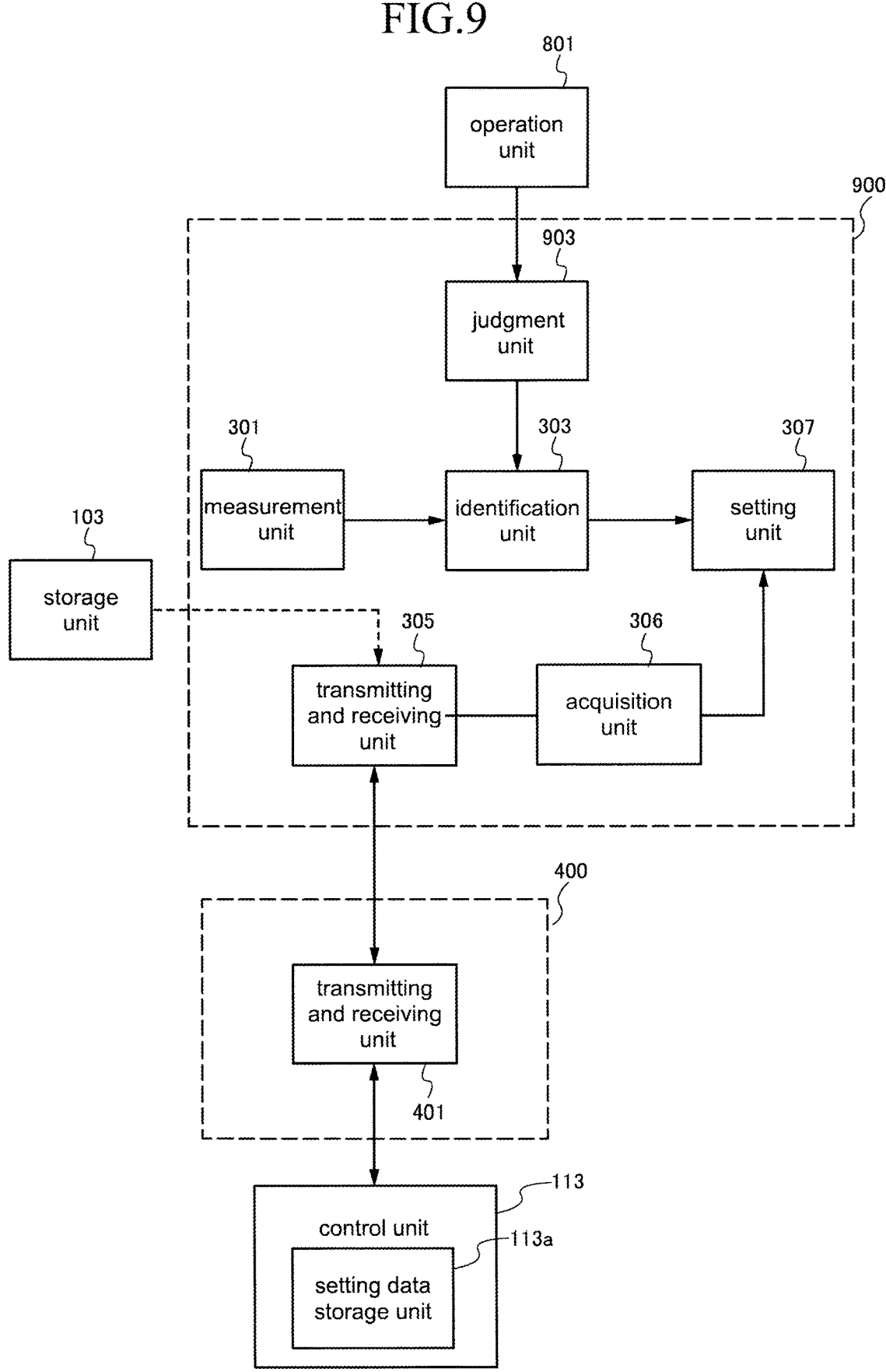
FIG. 9 is a block diagram showing a configuration of a setting function according to another embodiment of the present invention.

FIG. 9 is a block diagram showing a configuration of a setting function 900 of the setting device 11 according to a third embodiment. In FIG. 9, components which are identical or similar to those of the setting function 300 according to the first embodiment described above are given the same reference signs as those of the setting function 300 shown in FIG. 1, and a repeated description thereof is omitted.

The setting function 900 includes a judgment unit 903. The judgment unit 903 judges whether a mobile communication terminal that has transmitted setting data to the setting device 11 is a valid mobile communication terminal or an invalid mobile communication terminal. The judgment unit 903 judges whether the mobile communication terminal is valid or invalid based on a result of detection of the presence or absence of a user in a playing position of the musical instrument 14 (i.e. the predetermined position in the area around the musical instrument 14) by the detection unit 81. For example, in a case where the mobile communication terminal 13c has been identified as a mobile communication terminal to be communicated with the setting device 11, the setting device 11 receives setting data regarding generation of a sound of the musical instrument 14 from the mobile communication terminal 13c. After this, the judgment unit 903 judges whether the mobile communication terminal 13c is valid or invalid.

When where the detection unit 81 has detected the absence of a user in the playing position of the musical instrument 14, i.e. the absence of a current user who is using the musical instrument 14, the judgment unit 903 judges that the mobile communication terminal 13c is invalid. In this case, the identification unit 303 newly identifies a mobile communication terminal to be communicated with the setting device 11 from the mobile communication terminals 13a to 13d present around the setting device 11 and capable of communicating with the setting device 11. Meanwhile, when the detection unit 81 has detected the presence of a user in the playing position of the musical instrument 14, i.e. the presence of a current user who is using the musical instrument 14, the judgment unit 903 judges that the mobile communication terminal 13c is valid. In this case, the identification unit 303 does not newly identify a mobile communication terminal to be communicated with the setting device 11, and the setting unit 307 maintains the settings based on the setting data transmitted from the mobile communication terminal 13c.

When the detection unit 81 detects the presence of a user in the predetermined position in the area around the musical instrument 14, i.e. the presence of a current user who is using the musical instrument 14, it is highly possible that the user is playing the musical instrument 14. In the present embodiment, whether a user is playing the musical instrument 14 is judged by the judgment unit 903 judging whether a mobile communication terminal that has transmitted setting data to the setting device 11 is a valid mobile communication terminal or an invalid mobile communication terminal. Therefore, as long as the user is in the playing position of the musical instrument 14, i.e. as long as the user is playing the musical instrument 14, the setting device 11 can be prevented from communicating with another mobile communication terminal to change its settings.

It should be noted that in the present embodiment, whether a mobile communication terminal that has transmitted setting data to the setting device 11 is valid or invalid, i.e. whether the musical instrument 14 is being played by the user of a mobile communication terminal that has transmitted setting data to the setting device 11, is judged by the detection unit 81 detecting the presence or absence of a user in the predetermined position in the area around the musical instrument 14, i.e. the presence or absence of a current user who is using the musical instrument 14. However, this is not the only way to judge whether the musical instrument is being played. For example, in a case where a mobile communication terminal that has transmitted setting data to the setting device 11 maintains its signal strength for a predetermined period of time or as long as the mobile communication terminal maintains a signal strength in a predetermined range based on its signal strength, the judgment unit 903 may judge that the mobile communication terminal that has transmitted the setting data to the setting device 11 is valid. Further, as long as an operation on the operator 16 of the musical instrument 14 is detected by a control unit or the like of the musical instrument 14 after a mobile communication terminal identified as a mobile communication terminal to be communicated with the setting device 11 has transmitted setting data to the setting device 11, the judgment unit 903 may judge that the musical instrument 14 is being played, i.e. that the mobile communication terminal that has transmitted the setting data to the setting device 11 is valid.

Each of the foregoing embodiments has described, as an example, a case where the sound generation device is a musical instrument (electronic piano). However, a sound generation device according to the present invention is not limited to a musical instrument. For example, a sound generation device according to the present invention may be a game device. In this case, the sound generation device includes a control unit that controls the progress of a game and a controller that receives a user's operation for controlling the progress of the game. As with the sound generation devices described in the first to third embodiments above, the game device acquires setting data from a mobile communication terminal identified as a mobile communication terminal to communicate with. In this case, the setting data relates to control of generation of a sound that is emitted during the progress of the game. The game device emits a sound on the basis of the progress of the game by the user and the setting data thus acquired.

A configuration obtained by a person skilled in the art making an addition, deletion, or design variation of a constituent element as appropriate or making an addition, omission, or condition alternation of a step on the basis of a configuration described as an embodiment of the present invention is encompassed in the scope of the present invention, provided such a configuration includes the subject-matter of the present invention.

Further, other function effects different from those which are brought about by aspects of the aforementioned embodiments are construed as being naturally brought about by the present invention, provided such function effects are obvious from the descriptions in the specification or easily predictable by persons skilled in the art.

What is claimed is:

1. A communication method for setting data comprising:
   establishing a wireless communication with a sound generation device;
   transmitting to the sound generation device the setting data related to generation of sound or control of generation of sound in response to the establishing the wireless communication with the sound generation device; and
   terminating the wireless communication with the sound generation device after transmitting to the sound generation device the setting data,
   wherein the establishing the wireless communication is achieved by identifying one mobile communication terminal from a plurality of mobile communication terminals capable of communicating by a wireless signal, by the sound generation device, and
   the sound generation device is configured to output a sound based on the setting data after the terminating the wireless communication.

2. The communication method for setting data according to claim 1, wherein the setting data includes at least one of information regarding tone parameters of a musical instrument, a score, accompaniment data, and an applicable effector.

3. The communication method for setting data according to claim 1, further comprising receiving musical instrument information indicating a type of a musical instrument, wherein the setting data is the setting data based on the musical instrument information.

4. The communication method for setting data according to claim 1, wherein the sound generation device identifies another mobile communication terminal to be communication next after the terminating the wireless communication.

5. The communication method for setting data according to claim 4, wherein the sound generation device identifies another mobile communication terminal to be communication next based on an instruction from a user.

6. The communication method for setting data according to claim 1, wherein the sound generation device is configured to acquire the setting data and to detect an operation on the sound generation device to output a sound based on detected operation and the setting data.

7. A mobile communication terminal for wireless communication with a sound generation device, the mobile communication terminal comprising:
a processor; and
a memory storing instructions executable by the processor,
wherein:
the instructions include establishing the wireless communication with the sound generation device, transmitting to the sound generation device setting data related to generation of sound or control of generation of sound, and terminating the wireless communication with the sound generation device after transmitting to the sound generation device the setting data,
the wireless communication is established by identifying one mobile communication terminal from a plurality of mobile communication terminals capable of communicating by a wireless signal, by the sound generation device, and
the sound generation device is configured to output a sound based on the setting data after the terminating the wireless communication.

8. The mobile communication terminal according to claim 7, wherein the setting data includes at least one of information regarding tone parameters of a musical instrument, a score, accompaniment data, and an applicable effector.

9. The mobile communication terminal according to claim 7, wherein the setting data is the setting data based on musical instrument information indicating a type of a musical instrument, and the musical instrument information is transmitted from the sound generation device.

10. The mobile communication terminal according to claim 7, wherein the sound generation device identifies another mobile communication terminal to be communication next after the terminating the wireless communication.

11. The mobile communication terminal according to claim 10, wherein the sound generation device identifies another mobile communication terminal to be communication next based on an instruction from a user.

12. The mobile communication terminal according to claim 7, wherein the one mobile communication terminal from the plurality of mobile communication terminals capable of communicating by the wireless signal identified based on a signal strength of the wireless signal emitted from the plurality of mobile communication terminals.

13. The mobile communication terminal according to claim 12, wherein the one mobile communication terminal has the highest signal strength of the wireless signal.

14. The mobile communication terminal according to claim 7, wherein the sound generation device is configured to change settings based on the setting data after the terminating the wireless communication.

15. A communication method for setting data comprising:
establishing a wireless communication with a sound generation device;
transmitting to the sound generation device the setting data related to generation of sound or control of generation of sound in response to the establishing the wireless communication with the sound generation device; and
terminating the wireless communication with the sound generation device after transmitting to the sound generation device the setting data,
wherein:
the establishing the wireless communication is achieved by identifying one mobile communication terminal from a plurality of mobile communication terminals capable of communicating by a wireless signal, by the sound generation device, and
the sound generation device is configured to change settings based on the setting data after the terminating the wireless communication.

* * * * *